United States Patent
Tian (10) Patent No.: US 10,135,519 B1
(45) Date of Patent: Nov. 20, 2018

(54) ANTENNA ASSEMBLY SYSTEM

(71) Applicant: Pinnacle Vista, LLC, Upland, CA (US)

(72) Inventor: Yu Tian, Hong Kong (HK)

(73) Assignee: Pinnacle Vista, LLC, Upland, CA (US)

( * ) Notice: Subject to any disclaimer, the term of this patent is extended or adjusted under 35 U.S.C. 154(b) by 0 days.

(21) Appl. No.: 15/800,588

(22) Filed: Nov. 1, 2017

Related U.S. Application Data (60) Provisional application No. 62/522,027, filed on Jun. 19, 2017.

(51) Int. Cl.
| | |
|---|---|
| *H04B 7/185* | (2006.01) |
| *H01Q 1/12* | (2006.01) |
| *H01Q 1/28* | (2006.01) |
| H01Q 1/36 | (2006.01) |
| H01Q 1/32 | (2006.01) |
| G08G 5/00 | (2006.01) |

(52) U.S. Cl.
CPC ......... *H04B 7/18504* (2013.01); *H01Q 1/125* (2013.01); *H01Q 1/28* (2013.01); *H04B 7/18506* (2013.01); *G08G 5/0013* (2013.01); *H01Q 1/3275* (2013.01); *H01Q 1/362* (2013.01)

(58) Field of Classification Search
CPC ........ H01Q 19/106; H01Q 1/362; H01Q 1/28; H04W 16/28
USPC ................ 455/66.1, 67.11, 90.3, 575.7, 63.4
See application file for complete search history.

(56) References Cited

U.S. PATENT DOCUMENTS

| | | | |
|---|---|---|---|
| 2007/0279310 A1* | 12/2007 | Tsai ...................... | H01Q 1/1207 343/795 |
| 2008/0143636 A1* | 6/2008 | Couchman ............... | B64G 1/66 343/915 |
| 2012/0194407 A1* | 8/2012 | Kim ........................ | H01Q 1/084 343/882 |
| 2017/0301980 A1* | 10/2017 | Lavin ...................... | H01Q 1/287 |

* cited by examiner

*Primary Examiner* — John J Lee
(74) *Attorney, Agent, or Firm* — WPAT, P.C., Intellectual Property Attorneys; Anthony King (57) ABSTRACT

An antenna assembly includes: a first rod; a first casing having a first antenna installed thereon, and the first casing coupled to the first rod; a second rod, coupled to an outer surface of the first casing; and a second casing having a plurality of second antennas installed thereon, and the second casing coupled to the second rod. The assembly may include multiple numbers of casings each rotatably independent of one another, and allows the assembly to simultaneously communicate with multiple UAVs in the air.

14 Claims, 11 Drawing Sheets

ANTENNA ASSEMBLY SYSTEM

CROSS-REFERENCE TO RELATED APPLICATION

This application claims the benefit of U.S. Provisional Application No. 62/522,027 filed Jun. 19, 2017, which is hereby incorporated by reference in its entirety.

This application also contains subject matter similar to that disclosed in the concurrently field U.S. Non-Provisional Patent Application entitled "Antenna Assembly" (same applicant and same inventor), which is hereby expressly incorporated by reference as part of the present disclosure.

BACKGROUND

Unmanned aerial vehicles (UAVs) are remotely piloted or autonomous aircraft that can carry cameras, sensors, communications equipment, or other payloads. Stability of data transmission as well as the required data rate, which continuously increases, between a UAV controller and an UAV or among the UAVs is one of the key factors to evaluate the performance of UAVs. Therefore, there is a need for designing new antennae to satisfy the strict requirement of data transmission to and from UAV.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

SUMMARY OF THE DISCLOSURE

An antenna assembly comprised of multiple casings is contemplated. Some of the enclosed embodiments can communicate with a plurality of communication points simultaneously.

In one embodiment, the assembly has a first casing having a first flat panel antenna pivotably installed therein, and a second casing having a second flat panel antenna pivotably installed therein. The second casing can be rotatably coupled to the first casing, and the first casing can rotate independent of the second casing.

In some embodiments, the second casing is disposed directly below the first casing.

Further contemplated in the embodiments includes a helical antenna enclosed within the second casing, or within the bottommost casing.

Further contemplated in the embodiments includes an omni-directional antenna that can be disposed on an outer surface of the second casing.

There can be multiple numbers of casings. In one embodiment, a third casing can be included to have a third flat panel antenna disposed therein, and the third casing can be coupled to the first casing. Optionally, the first casing, second casing, and third casing can have substantially similar shapes.

In some embodiments, an inertial measurement unit can be coupled to at least one of said first and second flat panel antennae.

In other embodiments, at least one motor can be disposed within any of the disclosed casing.

In yet other embodiments, at least one power source can be disposed within any of the disclosed casing.

In specifically contemplated embodiments, the disclosed assembly of casings can be installed at the bottom of an unmanned aerial vehicle, and the casings can be rotatable independent of the unmanned aerial vehicle.

Optionally, the various casings can each rotate independent of other casings.

The unmanned aerial vehicle is contemplated to have controlling device to rotate the first casing, a second controlling device to rotate the second casing, a helical antenna enclosed in the second casing, and an omni-directional antenna disposed on an outer surface of the second casing.

In one contemplated example, the casings are connected in series underneath the unmanned aerial vehicle.

Part of the disclosure includes a contemplated method of using a relay UAV (unmanned aerial vehicle) to simultaneously relay data between a transmission point located below the relay UAV and a plurality of working UAVs. In one contemplated embodiment, multiple numbers of casings are coupled to the UAV, each casing capable of communicating with a different UAV.

In one embodiment, the method includes providing said relay UAV to fly directly above said transmission point, wherein the transmission point includes a ground vehicle, a watercraft, a stationary transmission point, and a portable transmission device. The method also includes providing said plurality of working UAV to fly in the air and providing a first casing having a first flat panel antenna pivotably installed therein, and the first casing can be coupled to a bottom side of the relay UAV.

The method can include providing a second casing having a second flat panel antenna pivotably installed therein, wherein the second casing is rotatably coupled to the first casing.

The method can include providing wherein the first casing is capable of rotating independent of the second casing, and wherein the second casing is disposed directly below the first casing.

Optionally, the method can provide an omni-directional antenna disposed on a bottommost of said first and second casings.

The contemplated data to transmit can be a control signal, an image signal, or a video signal. A helical antenna disposed within the bottommost of the plurality of casings can transmit data received by first and second panel antennae, and then send the signal to the transmission point on the ground below.

DETAILED DESCRIPTION

The various embodiments can now be better understood by turning to the following description. These embodiments are presented as illustrated examples.

Many alterations and modifications may be made by those having ordinary skill in the art without departing from the spirit and scope of the embodiments. Therefore, it must be understood that the illustrated embodiments have been set forth only for the purposes of example and that they should not be taken as limiting.

The words used in this specification to describe the embodiments are to be understood not only in the sense of their commonly defined meanings, but to include by special definition in this specification structure, material or acts beyond the scope of the commonly defined meanings.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements disclosed or that a single element may be substituted for two or more elements. Although elements may be described herein as acting in certain combinations, it is to be expressly understood that one or more elements from a disclosed combination can in some cases be excised from the combination and that the combination may be directed to a sub-combination or variation of a sub-combination.

The inventor has discovered new ways to improve the integrity, effectiveness, and production cost of antennae for data transmission to and from the following communication points: UAV or drone, mobile ground station, land vehicle, watercraft, stationary control center on the ground, control center on top of a building, and handheld device. This disclosure also includes a novel method of antennae placement/arrangement to minimize interference.

The word interference covers radio interference and also physical obstruction. Physical obstruction means that when antenna A is physically located in the middle of a line of sight between two other antennae, such as antenna B and antenna C, that are communicating with each other, antenna A is physically obstructing the communication between B and C.

It should be especially noted that although this disclosure specifically discusses using the contemplated antenna design on a UAV or on a land vehicle for data transmission to and from a UAV, the contemplated antenna can be used in any suitable data transmission scenarios, whether with or without a UAV. One or ordinary skill in the art would appreciate that the contemplated embodiments can be used in other data transmission situations.

Further, spatially relative terms, such as "beneath," "below," "lower," "above," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element, or intervening elements may be present.

Figure 1:
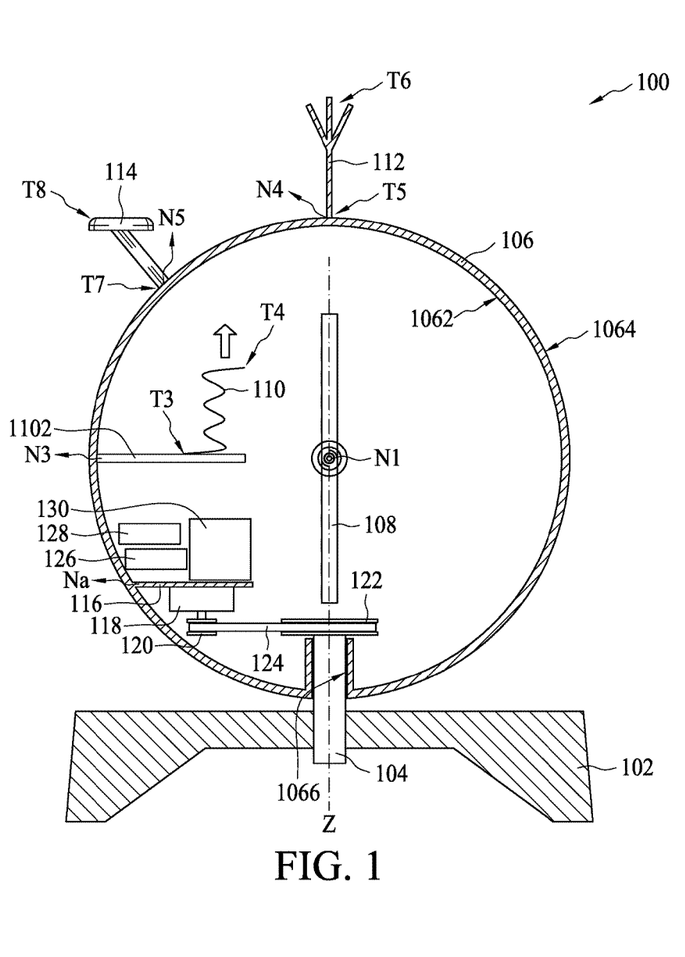
FIG. 1 is a diagram illustrating an antenna assembly according to some embodiments of the present invention.

FIG. 1 is a diagram illustrating an antenna assembly 100 according to some embodiments of the present invention. The antenna assembly 100 comprises a base 102, a first rod 104, a curvy frame 106, and a plurality of antennae 108, 110, 112, 114. The base 102 is arranged to be installed on a moving object, such as a vehicle or an unmanned aerial vehicle (UAV), for fixing the antenna assembly 100 on the moving object. The base 102 is a support base of the antenna assembly 100. The first rod 104 is coupled to the base 102. The first rod 104 may be fixedly installed on the base 102. The curvy frame 106 is coupled to the first rod 104, and the curvy frame 106 is arranged to be rotatable around the longitudinal axis Z of the first rod 104. A portion of the first rod 104 is disposed inside the curvy frame 106 while on other portion of the first rod 104 is disposed outside the curvy frame 106.

For illustrative purpose, the curvy frame 106 is a spherical and transparent casing, and this is not a limitation of the present embodiments. The casing may not be transparent. According to some embodiments, the curvy frame 106 may be designed to have other shapes. For example, the curvy frame 106 may be in a shape that conforms with the overall contour and design of the UAV or land vehicle that the antenna assembly 100 installed on so that the contemplated antenna assembly 100 is less noticeable. In yet further embodiments, the curvy frame 106 may be any other shapes that are deemed aerodynamic.

It is noted that the curvy frame 106 may be used for protecting the elements enclosed therein from damage when crashing. However, the curvy frame 106 may be omitted for reducing the cost or for easing the repairing of the elements.

According to some embodiments, the curvy frame 106 has an inner surface 1062 and an outer surface 1064. Furthermore, the curvy frame 106 is arranged to have a hole 1066, and the first rod 104 is inserted in the hole 1066. It is noted that the first rod 104 is not fixedly attached on the inner surface of the hole 1066. Instead, the first rod 104 is rotatably installed on the inner surface of the hole 1066 such that the curvy frame 106 may rotate around the longitudinal axis Z of the first rod 104.

In order to control the curvy frame 106 to rotate around the first rod 104, the antenna assembly 100 further comprises a rack 116, a motor 118, a second rod 120, a flywheel 122, a belt 124, a control panel 126, a control board 128, and a power supply 130. According to some embodiments, the rack 116 is fixedly coupled to a predetermined position Na of the inner surface 1062. The motor 118 is coupled to a bottom side of the rack 116. The rack 116 is horizontally disposed in the lower portion inside the curvy frame 106.

The motor 118 is fixedly coupled to the bottom side of the rack 116. The second rod 120 is a rotatable rod coupled to the motor 118. The motor 118 is arranged to rotate the second rod 120 for driving the belt 124. As shown in FIG. 1, the flywheel 122 is coupled to the first rod 104. For example, the flywheel 122 is fixedly attached on the top of the first rod 104. The belt 124 is mounted on the flywheel 122 and the second rod 120. According to some embodiments, the motor 118 is arranged to rotate the second rod 120 and accordingly turns the belt 124. As the flywheel 122 is fixedly attached on the top of the first rod 104, and the curvy frame 106 is rotatably installed on the first rod 104, the turning of the second rod 120 and the belt 124 may cause the curvy frame 106 to rotate around the longitudinal axis Z of the first rod 104.

Moreover, the control panel 126 of the antenna assembly 100 is disposed on the upper side of the rack 116 for transmitting a video signal. The control board 128 is disposed on the control panel 126 for compensating a movement of the antenna assembly 100. The power supply 130 is disposed on the upper side of the rack 116 for supplying power to the motor 118, the control panel 126, and the control board 128. It is noted that the control panel 126, the control board 128, and the power supply 130 may be optional in some embodiments.

According to some embodiments, the first antenna 108 may be a panel antenna. For example, the panel antenna is a square shape panel antenna. The second antenna 110 may be a helical antenna. The third antenna 112 may be an omni-directional antenna. The fourth antenna 114 is arranged to receive a Global Positioning System (GPS) coordinates of the antenna assembly 100. The casing of the curvy frame 106 encloses the first antenna 108 and the second antenna 110, i.e. the first antenna 108 and the second antenna 110 are disposed on the inner surface 1062 of the curvy frame 106. The third antenna 112 and the fourth antenna 114 are disposed on the outer surface 1064 of the curvy frame 106.

The GPS antenna is optional because in some embodiments, GPS signal can be received by the UAV to which the antenna assembly is attached to, obviating the need for the antenna assembly to have its own GPS antenna.

Figure 2:
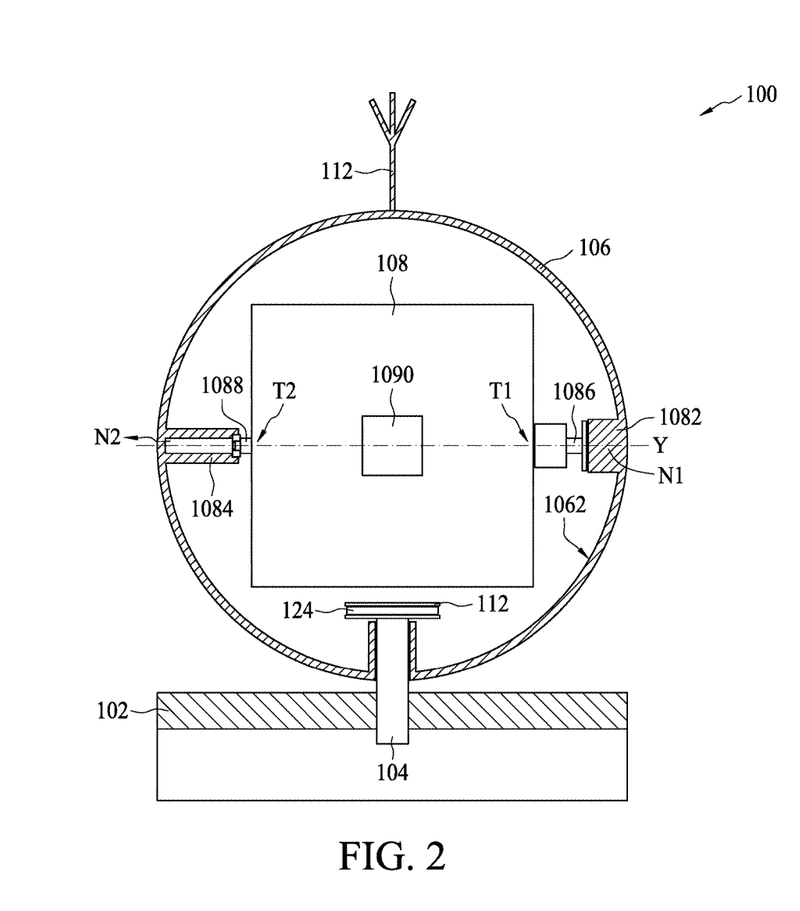
FIG. 2 is a diagram illustrating a front view of the antenna assembly of FIG. 1 according to some embodiments of the present invention.

FIG. 2 is a diagram illustrating a front view of the antenna assembly 100 according to some embodiments of the present invention. The first antenna 108 has a first end T1 coupled to a first position N1 of the inner surface 1062 of the curvy frame 106, and a second end T2 coupled to a second position N2 of the inner surface 1062 of the curvy frame 106. The first antenna 108 is arranged to be rotatable around a pivot Y extending from the first position N1 to the second position N2. According to some embodiments, the antenna assembly 100 further comprises a motor 1082, a sleeve 1084, a first pivot axle 1086, a second pivot axle 1088, and a measurement unit 1090. The motor 1082 is coupled to the first position N1 of the inner surface 1062. The sleeve 1084 is fixedly coupled to the second position N2 of the inner surface 1062. The first pivot axle 1086 is fixedly coupled to the first end T1 of the first antenna 108. The second pivot axle 1088 is fixedly coupled to the second end T2 of the first antenna 108. In addition, the first pivot axle 1086 is coupled to the motor 1082, the second pivot axle 1088 is wedged into the sleeve 1084. The motor 1082 is arranged to turn the first pivot axle 1086 for rotating the first antenna 108. Therefore, the pitch of the first antenna 108 is directly controlled by the motor 1082. It should be noted that, although the moving system is illustrated as belt driven system, there can be various other types such as servo motor, brushless motor, gear box, etc.

The measurement unit 1090 is formed on the middle portion of the first antenna 108 for measuring an angle between the first antenna 108 relative to a remote object. The measurement unit 1090 may be formed on other portions, such as a side portion, on the first antenna 108. According to some embodiments, the measurement unit 1090 is an inertial measurement unit (IMU). The IMU allows the control board 128 to compensate sudden movements of the antenna assembly 100, such as the sudden movements of the vehicle that the antenna assembly 100 installed on, by instantly adjusting the yaw and pitch via controlling the side motor 1082 and the bottom motor 118. The IMU allows instant measurement of the angle of the first antenna 108 relative to the UAV. For brevity, these components function similar to a 2-axis gimbal.

According to some embodiments, the power supply 130 may further supply power to the motor 1082 and the measurement unit 1090. However, this is not a limitation of the present embodiments.

Referring to FIG. 1 again, the second antenna 110 having a first end T3 coupled to a third position N3 of the inner surface 1062 of the curvy frame 106, and a second end T4 exposed to an inner space surrounded by the curvy frame 106. According to some embodiments, the antenna assembly 100 further a platform 1102 for supporting the second antenna 110. The platform 1102 has first side fixedly coupled to the third position N3, and a second side extended to the inner space of the curvy frame 106. The first end T3 of the second antenna 110 is coupled to the platform 1102. For example, the first end T3 of the second antenna 110 is fixedly disposed on the upper surface of the platform 1102.

The second antenna 110 is arranged to transmit video data and other data to and from another communication point located directly above or below the antenna assembly 100. For example, when the second antenna 110 points upward (i.e. the arrow above the second antenna 110), the second antenna 110 can communicate with a UAV hovering directly above the antenna assembly 100. This is especially desirous when the ground obstacles, e.g., tall buildings, are in the way of transmitting data from a ground communication point, e.g., land vehicle driving through tall buildings.

The third antenna 112 has a first end T5 fixedly coupled to a fourth position N4 of an outer surface 1064 of the curvy frame 106, and a second end T6 exposed to an outer space outside the curvy frame 106. According to some embodiments, the third antenna 112 is an omni-directional antenna. Therefore, the third antenna 112 may have a plurality of second ends T6 exposed to the outer space. Moreover, the fourth position N4 is located opposite to the first rod 104. The fourth position N4 may be the top of the casing, and the first rod 104 may be located at the bottom of the casing.

The fourth antenna 114 has a first end T7 fixedly coupled to a fifth position N5 of the outer surface 1064 of the curvy frame 106, and a second end T8 exposed to the outer space outside the curvy frame 106. According to some embodiments, the fifth position N5 of the outer surface 1064 is different from the fourth position N4 of the outer surface 1064. For example, the fifth position N5 is located on the upper portion of the casing. The fourth antenna 114 is arranged to receive a Global Positioning System (GPS) coordinates of the antenna assembly 100, and the third antenna 112 is arranged to transmit the GPS coordinates to the remote object.

According to some embodiments, the fourth antenna 114 may be replaced with a receiver for obtaining the GPS coordinates of the antenna assembly from satellite. The receiver may be disposed on the upper portion of the casing.

Figure 3:
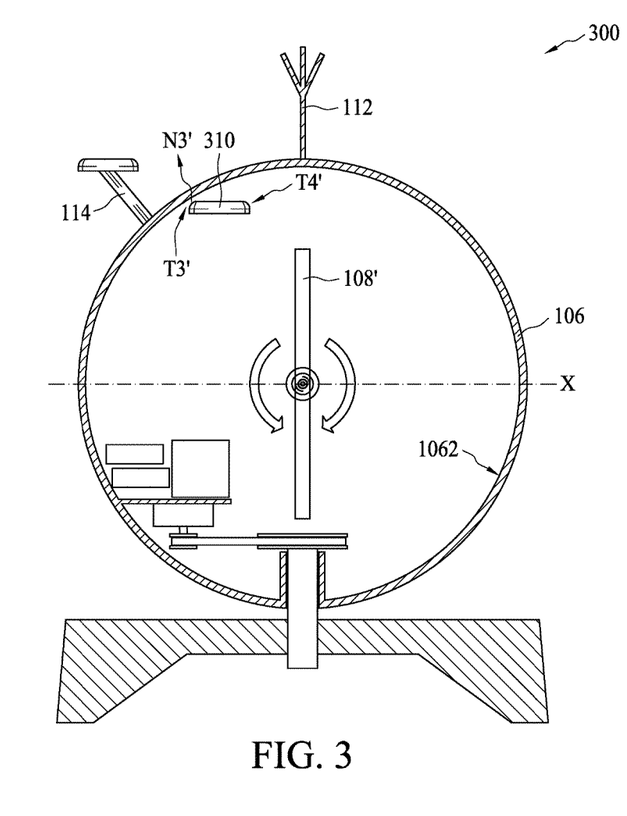
FIG. 3 is a diagram illustrating an antenna assembly according to some embodiments of the present invention.

According to the antenna assembly 100, the first antenna 108 is coupled within the curvy frame 106 about the pivot Y. This arrangement allows the first antenna 108 to tilt to a wide range of degrees. According to some embodiments, the range of movement may be plus and minus 20 degrees. In other embodiment, such as the embodiment as shown in FIG. 3, the range movement can be much greater, such as plus and minus 90 degrees. Yet in another embodiment, the first antenna 108 is capable to tilt an angle between −20~−90 degrees to +20~+90 degrees around the pivot Y. This movement effectively adjusts the pitch of the first antenna 108. This allows the first antenna 108 to change its pitch to optimize data transmission by directly aiming the first antenna 108 towards the other communication point, e.g., a UAV. Moreover, the first antenna 108 is arranged to rotate around the pivot Y, the second antenna 110 is arranged to directly point upward, the third antenna 112 is disposed on the top of the curvy frame 106, and the fourth is disposed on the upper portion of the curvy frame 106 and does not obstruct the direction of the second antenna 110, therefore the placement of the first antenna 108, the second antenna 110, the third antenna 112, and the fourth antenna 114 have the minimum interference with each other.

According to some embodiments, the second antenna 110 may be replaced with an upward-detecting panel antenna as shown in FIG. 3. FIG. 3 is a diagram illustrating an antenna assembly 300 according to some embodiments of the present invention. In this embodiment, the transmission of video data is carried out by the upward-detecting panel antenna 310. For brevity, the other element numerals of the antenna assembly 300 are similar to those of the antenna assembly 100. The upward-detecting panel antenna 310 having a first side T3' coupled to a position N3' of the inner surface 1062 of the curvy frame 106, and a second side T4' extended to an inner space surrounded by the curvy frame 106. The upward-detecting panel antenna 310 performs the similar functions to the second antenna 110 of the antenna assembly 100. However, the size of the upward-detecting panel antenna 310 is smaller than the size of the second antenna 110, and the upward-detecting panel antenna 310 is disposed almost on the top of the curvy frame 106. Therefore, the first antenna 108' of the antenna assembly 300 may be designed to have larger size than the first antenna 108 of the antenna assembly 100. Moreover, the first antenna 108' may have a larger pitch than the first antenna 108 of the antenna assembly 100 because the upward-detecting panel antenna 310 is kept away from the rotation radius of the first antenna 108'. For example, the first antenna 108' may adjust its pitch to or beyond a horizontal axis X as shown in FIG. 3.

Figure 4:
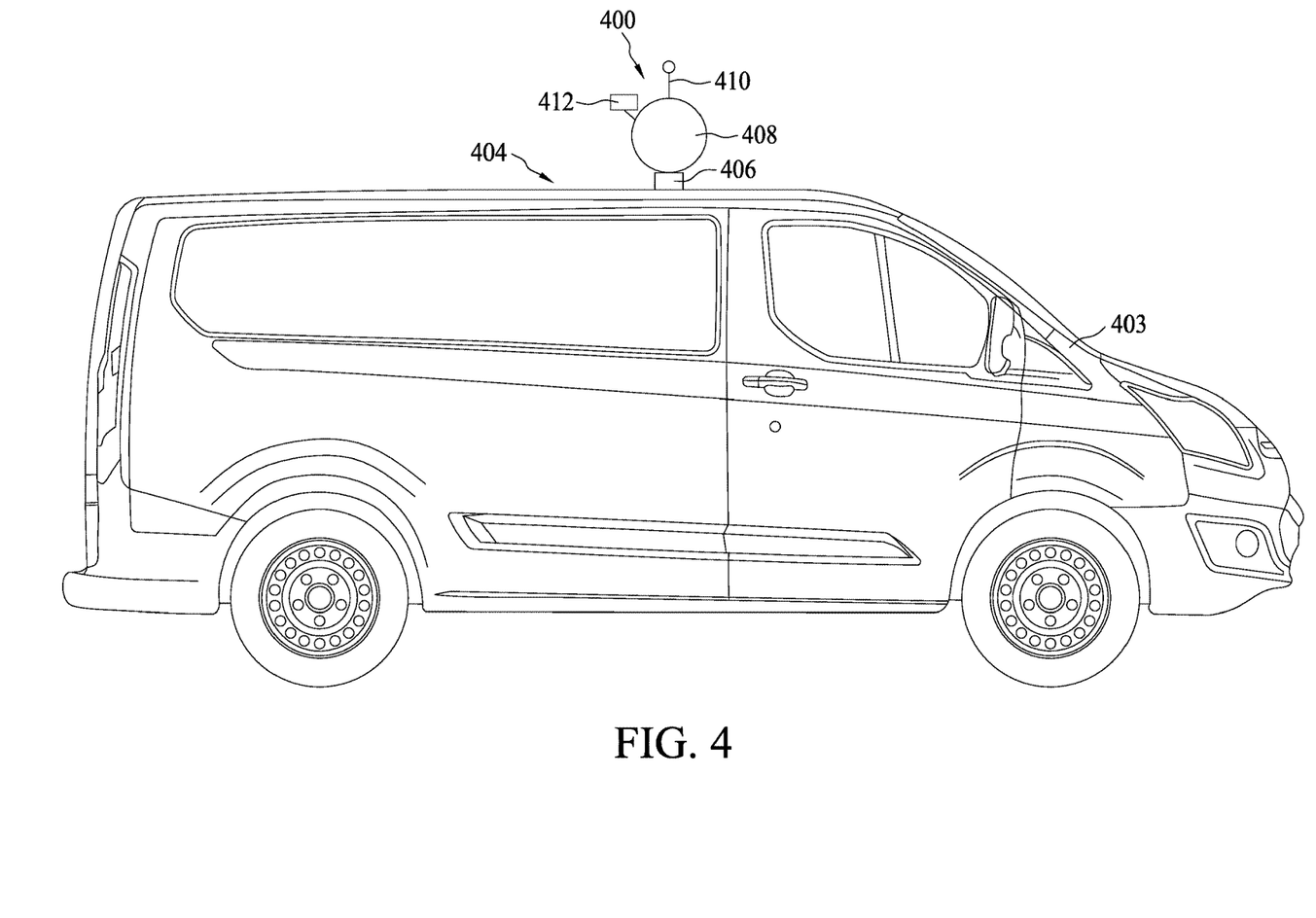
FIG. 4 is a diagram illustrating a vehicle applying an antenna assembly according to some embodiments of the present invention.

FIG. 4 is a diagram illustrating a vehicle 402 applying an antenna assembly 400 according to some embodiments of the present invention. The vehicle 402 is a land vehicle. The antenna assembly 400 may be the antenna assembly 100 or the antenna assembly 300. The antenna assembly 400 is arranged to point upward for transmitting video data to a communication point above the vehicle, e.g., a UAV. According to the embodiment of FIG. 4, the antenna assembly 400 is installed on the top 404 of the vehicle 402 for communicating with a UAV flying above the vehicle 402. To make the antenna assembly 400 pointing upward, the base 406 of the antenna assembly 400 is installed on the top 404 of the vehicle 402. The other elements of the antenna assembly 400, such as the spherical casing 408, the omni-directional antenna 410, and the GPS receiver 412, are disposed above the base 406. It is noted that, similar to the antenna assembly 100 or the antenna assembly 300, the antenna assembly 400 further comprises a panel antenna, a helical antenna, a rack, a motor, a rod, a flywheel, a belt, a control panel, a control board, and/or a power supply disposed on inside the spherical casing 408. As the configuration of the antenna assembly 400 is similar to the antenna assembly 100 or the antenna assembly 300, and the detailed description is omitted here for brevity.

Figure 5A:
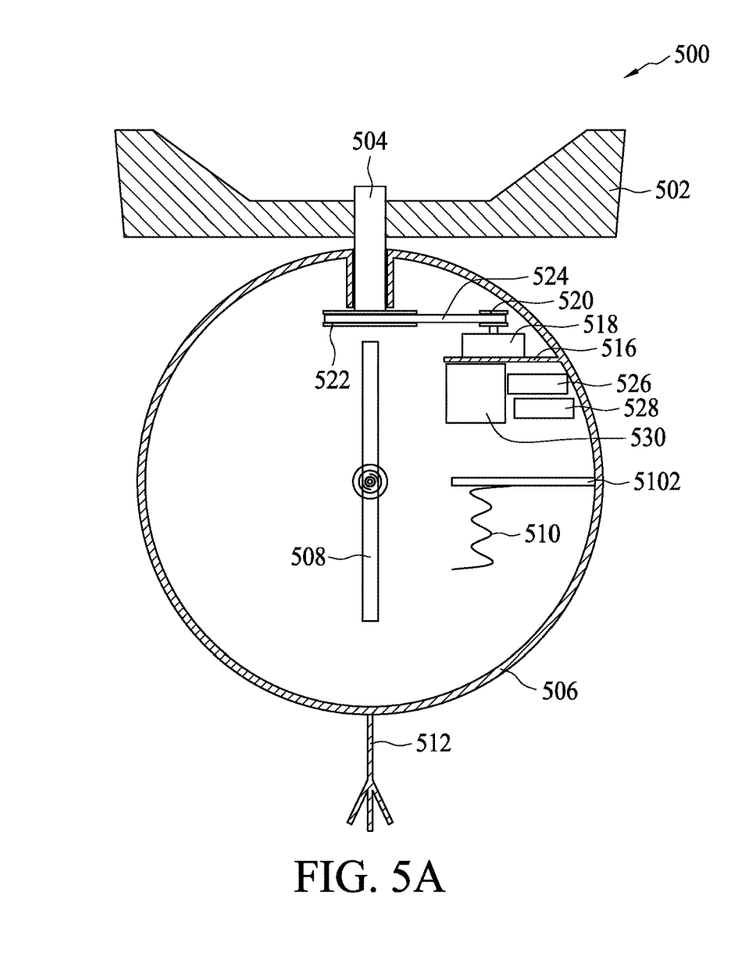
FIG. 5A is a diagram illustrating an antenna assembly according to some embodiments of the present invention.
Figure 5B:
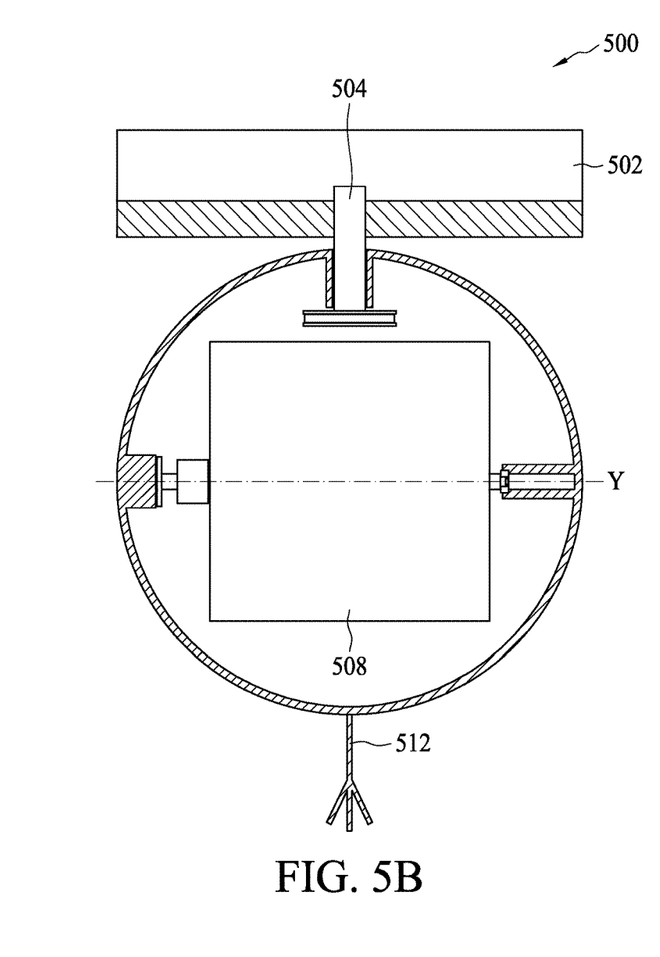
FIG. 5B is a diagram illustrating a front view of the antenna assembly of FIG. 5A according to some embodiments of the present invention.

It is noted that the antenna assembly 100 or the antenna assembly 300 may be arranged to point downward for transmitting video data to a communication point below or around the antenna assembly, e.g. a boat or a land vehicle. FIG. 5A is a diagram illustrating an antenna assembly 500 according to some embodiments of the present invention. FIG. 5B is a diagram illustrating a front view of the antenna assembly 500 according to some embodiments of the present invention. The antenna assembly 500 comprises a base 502, a first rod 504, a spherical casing 506, a panel antenna 508, a helical antenna 510, an omni-directional antenna 512, a platform 5102, a rack 516, a motor 518, a second rod 520, a flywheel 522, a belt 524, a control panel 526, a control board 528, and a power supply 530. According to some embodiments, the base 502, the first rod 504, the spherical casing 506, the panel antenna 508, the helical antenna 510, the omni-directional antenna 512, the platform 5102, the rack 516, the motor 518, the second rod 520, the flywheel 522, the belt 524, the control panel 526, the control board 528, and the power supply 530 are similar to the base 102, the first rod 104, the curvy frame 106, the first antenna 108, the second antenna 110, the third antenna 112, the platform 1102, the rack 116, the motor 118, the second rod 120, the flywheel 122, the belt 124, the control panel 126, the control board 128, and the power supply 130 respectively, and thus the detailed description is omitted here for brevity. For example, the antenna assembly 500 is coupled to the bottom of a UAV, and the helical antenna 510 points downward to transmit video data to a communication point directly below the UAV, e.g., a boat or a land vehicle below the UAV. Similar to the antenna assembly 300, the helical antenna 510 and the platform 5102 may be replaced with a downward-detecting panel antenna. In comparison to the antenna assembly 100, the GPS receiver or a wireless receiver is not installed on the outer surface of the spherical casing 506 of the antenna assembly 500. However, this is not a limitation of the present embodiment. The GPS receiver may be installed on the suitable outer surface of the spherical casing 506, such as the position closer to the base 502, of the antenna assembly 500 for receiving GPS coordinates from satellite.

Figure 6:
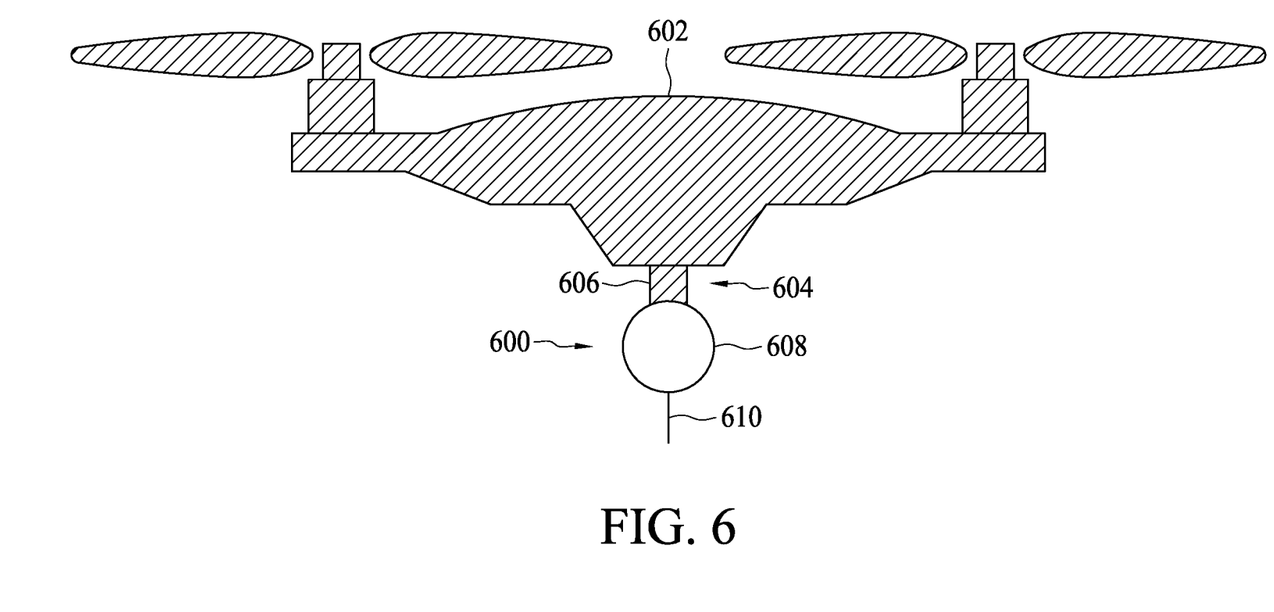
FIG. 6 is a diagram illustrating a UAV applying an antenna assembly according to some embodiments of the present invention.

FIG. 6 is a diagram illustrating a UAV 602 applying an antenna assembly 600 according to some embodiments of the present invention. The antenna assembly 600 may be the antenna assembly 500. The antenna assembly 600 is arranged to point downward for transmitting video data to a communication point below or around the UAV 602, e.g., a land vehicle. According to the embodiment of FIG. 6, the antenna assembly 600 is installed on the bottom 604 of the UAV 602 for communicating with a vehicle moving below the UAV 602. To make the antenna assembly 600 pointing downward, the base 606 of the antenna assembly 600 is installed on the bottom 604 of the UAV 602. The other elements of the antenna assembly 600, such as the spherical casing 608 and the omni-directional antenna 610, are disposed below the base 606. It is noted that, similar to the antenna assembly 500, the antenna assembly 600 further comprises a panel antenna, a helical antenna, a rack, a motor, a rod, a flywheel, a belt, a control panel, a control board, and/or a power supply disposed on inside the spherical casing 608. As the configuration of the antenna assembly 600 is similar to the antenna assembly 500, and the detailed description is omitted here for brevity.

According to the above embodiments, a plurality of antennae are installed on a spherical casing, and the plurality of antennae have the minimum interference with each other. Therefore, the capability of data transmission of the present antenna assembly is improved.

When a drone communicates with another drone via multiple transmission channels (e.g. one channel transmits data while another channel transmits video), and when each transmission channel requires a separate antenna, then the drone is required to be equipped with multiple antennae on its body. The present embodiments have minimized interference between multiple antennae on a single drone. In addition, the disclosed spherical outer casing minimizes damage to each antenna contained therein, whereas prior art drones typically has antennae exposed to the elements and is prone to damage due to a crash, getting hit by a bird, and inclement weather.

The disclosed spherical antenna assembly contains multiple antennae within a single housing. All antennae may be enclosed within the same housing. In another embodiment, one or more antennae may be attached to the outside of the housing.

In another contemplated embodiment, the spherical antenna assembly can be interchangeably installed on a car, on a tripod, under a drone, on a boat, etc.

In yet another contemplated embodiment, the spherical antenna assembly can be quickly and detachably attached to a car, on a tripod, under a drone, on a boat, etc. For example, when a spherical antenna assembly on a drone has malfunctioned in the field, the user may quickly detach it and reinstall another spherical antenna assembly onto the drone with ease, allowing a quick replacement so the drone may continue its duty with minimum down time.

The contemplated shape of the outer casing minimizes disturbance from the wind.

According to the embodiments, all movements can be controlled to compensate movement of the drone so that the panel antenna within the spherical outer casing can stay fixated on a target.

According to the embodiments, when the present antenna assembly is installed on the ground, the antenna assembly may have only 1-axis of movement (i.e., pitch). This may minimize the cost of having to rotate the assembly in a yaw direction. For example, when the antenna assembly is installed on a building pointing at only one direction, and the drone it is communicating with is only fly within a certain area in the same direction, then there is no need for the antenna assembly to change its yaw. However, the antenna assembly may have 2-axis of movement (i.e., pitch and yaw) when the antenna assembly is installed on the ground.

According to the embodiments, when the antenna assembly is installed on a mobile object (e.g., a car, a boat) traveling on the ground or over water, the antenna assembly may have 2-axis of movement (i.e., pitch and yaw). For example, as the car drives around in all directions, the antenna assembly would need constantly to change its yaw so that the panel antenna stays fixated on the same target.

According to the embodiments, the antenna assembly is installed and inverted under a drone/airplane/helicopter/any other aerial vehicle.

Figure 7:
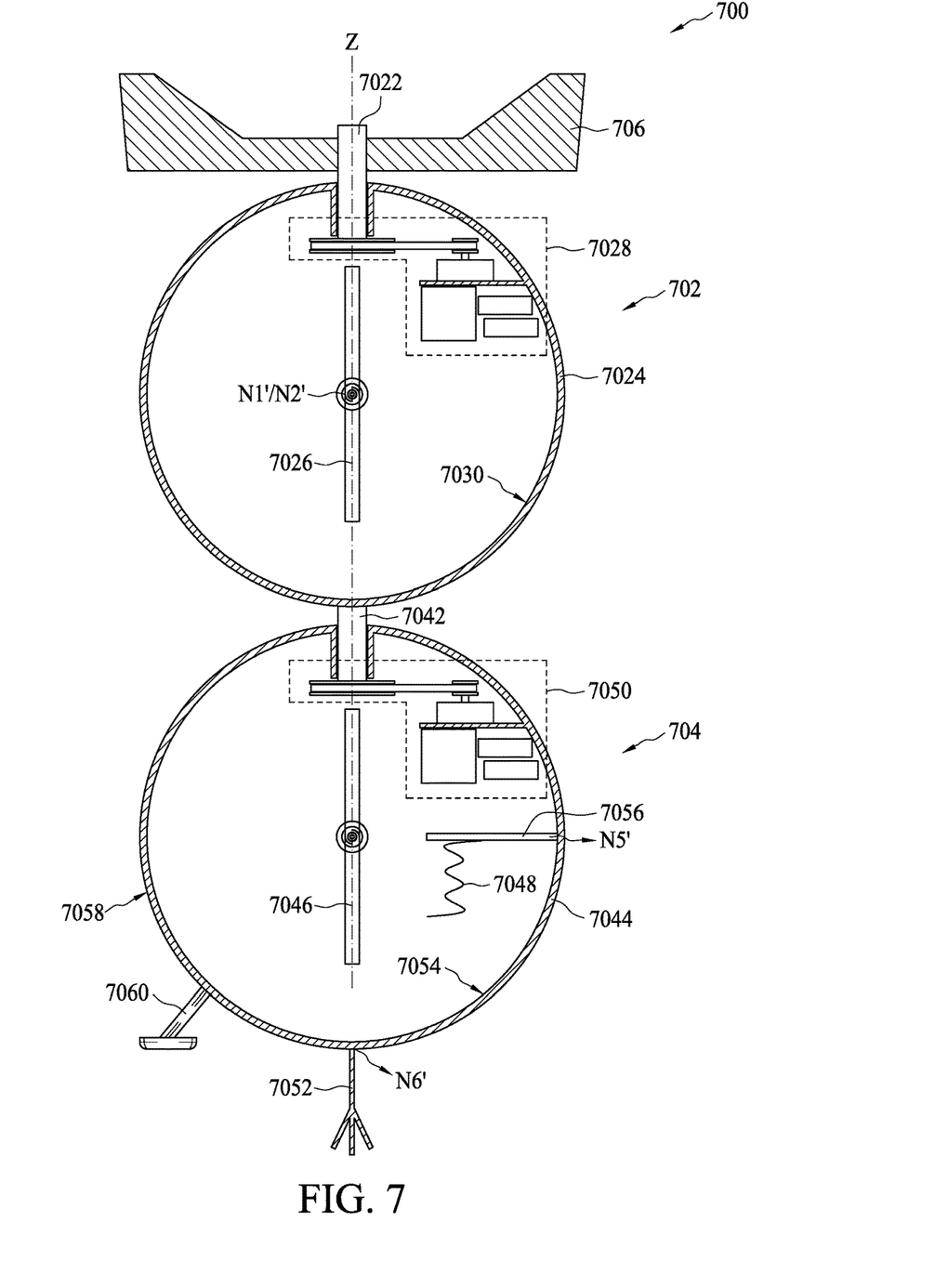
FIG. 7 is a diagram illustrating an antenna assembly according to some embodiments of the present invention.

In addition, according to some embodiments, a plurality of antenna assemblies may be coupled to each other to form a string of antenna assemblies, in which the antenna assemblies are controlled independently. FIG. 7 is a diagram illustrating an antenna assembly 700 according to some embodiments of the present invention. The antenna assembly 700 comprises a first rotatable antenna 702 and a second rotatable antenna 704. The first rotatable antenna 702 and the second rotatable antenna 704 are connected in series. According to some embodiments, the antenna assembly 700 is arranged to point downward to transmit video data to a communication point directly below or around it, e.g., a boat or a land vehicle. Therefore, the base 706 of the antenna assembly 700 is on the top of the antenna assembly 700. In application, the base 706 is installed on the bottom of a UAV, for example, to make the antenna assembly 700 to point downward. The first rotatable antenna 702 comprises a first rod 7022, a first casing 7024, a first antenna 7026, and a first moving control system 7028. The second rotatable antenna 704 comprises a second rod 7042, a second casing 7044, a second antenna 7046, a third antenna 7048, a second moving control system 7050, and a fourth antenna 7052.

The first rod 7022 is fixedly installed on the base 706. The top of the first casing 7024 is coupled to the first rod 7022, and the first casing 7024 is arranged to be rotatable around the longitudinal axis Z' of the first rod 7022. The first antenna 7026 is a panel antenna having a first end coupled to a first position N1' of the inner surface 7030 of the first casing 7024, and a second end coupled to a second position NT, which is opposite to the first position N1', of the inner surface 7030 of the first casing 7024. The first antenna 7026 is arranged to be rotatable around a pivot extending from the first position N1' to the second position N2'. The first moving control system 7028 is coupled between the first rod 7022 and the inner surface 7030 of the first casing 7024. Similar to the antenna assembly 100, the first moving control system 7028 comprises a rack, a motor, a rod, a flywheel, a belt, a control panel, a control board, and a power supply. As the rack, the motor, the rod, the flywheel, the belt, the control panel, the control board, and the power supply of the first rotatable antenna 702 are similar to the rack 116, the motor 118, the rod 120, the flywheel 122, the belt 124, the control panel 126, the control board 128, and the power supply 130 respectively, the detailed description is omitted here for brevity.

In addition, the first rod 7042 is coupled to the bottom of the outer surface of the first casing 7024. The top of the second casing 7044 is coupled to the second rod 7042, and the second casing 7044 is arranged to be rotatable around the longitudinal axis Z' of the second rod 7042. According to some embodiments, the second rotatable antenna 704 further comprises a second base (not shown) disposed on the bottom of the first casing 7024, and the first rod 7042 is fixedly installed in the second base. The second antenna 7046 is a panel antenna having a first end coupled to a first position N3' of the inner surface 7054 of the second casing 7044, and a second end coupled to a second position N4', which is opposite to the first position N3', of the inner surface 7054 of the second casing 7044. The second antenna 7046 is arranged to be rotatable around a pivot extending from the first position N3' to the second position N4'. The third antenna 7048 is a helical antenna having a first end coupled to a platform 7056, and a second end exposed to the inner space of the second casing 7044. The platform 7056 is fixedly coupled to a third position N5' of the inner surface 7054 of the second casing 7044. The third antenna 7048 is arranged to point downward. The fourth antenna 7052 is an omni-directional antenna having a first end fixedly coupled to a fourth position N6' of an outer surface 7058 of the second casing 7044, and a second end exposed to an outer space outside the second casing 7044. The fourth position N6' is on the bottom of the second casing 7044. The second moving control system 7050 is coupled between the second rod 7042 and the inner surface 7054 of the second casing 7044. Similar to the antenna assembly 100, the second moving control system 7050 comprises a rack, a motor, a rod, a flywheel, a belt, a control panel, a control board, and a power supply. As the rack, the motor, the rod, the flywheel, the belt, the control panel, the control board, and the power supply of the second antenna 704 are similar to the rack 116, the motor 118, the rod 120, the flywheel 122, the belt 124, the control panel 126, the control board 128, and the power supply 130 respectively, the detailed description is omitted here for brevity.

It is noted that, in the antenna assembly 700, the GPS receiver or a wireless receiver is not installed on the outer surface of the first casing 7024 and the casing 7044. However, this is not a limitation of the present embodiment. A GPS receiver may be installed on a suitable position on the outer surfaces of the first casing 7024 and the casing 7044 for receiving GPS coordinates from satellite.

According to some embodiments, the operations of the first rotatable antenna 702 and the second rotatable antenna 704 are independent. The first moving control system 7028 and the second moving control system 7050 are arranged to rotate the corresponding first casing 7024 and the second casing 7044 independently. In addition, the rotation of the first antenna 7026 and the rotation of the second antenna 7046 are independent. For example, each of the panel antennae 7026 and 7046 can adjust their pitch independently. Likewise, the spherical outer casings 7024 and 7044 can adjust their yaw independently. Each of the rotatable antennae 702 and 704 can independently aim towards a different communication point. The omni-directional antenna 7052 at the very bottom of the two rotatable antennae 702 and 704 can broadcast the GPS coordinate of the UAV to other communication points.

Figure 8:
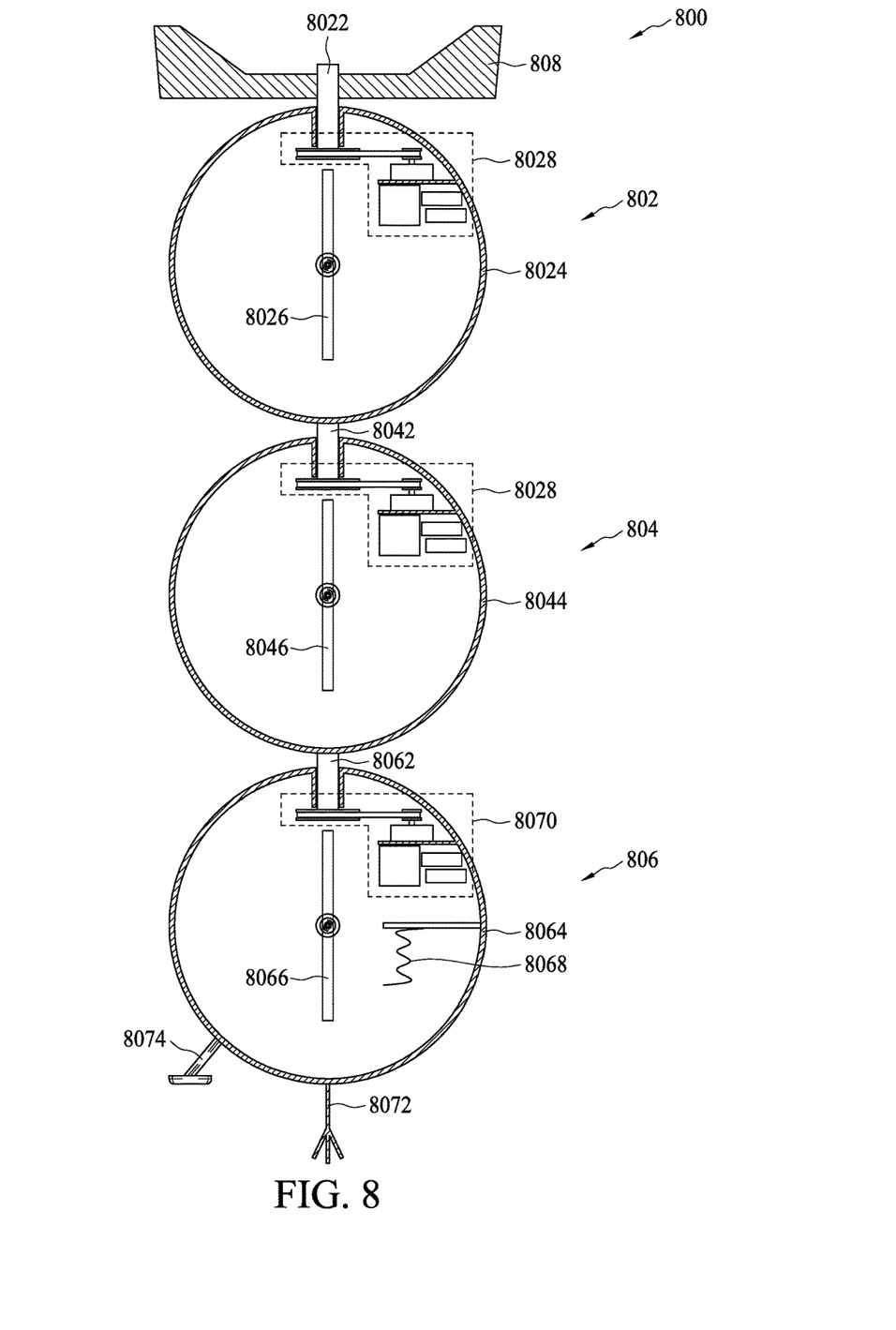
FIG. 8 is a diagram illustrating an antenna assembly according to some embodiments of the present invention.

According to the antenna assembly 700, the first rotatable antenna 702 having one antenna (i.e. 7026) is disposed between the base 706 and the second rotatable antenna 704 having three antennae (i.e. 7046, 7048, and 7052). However, this is not a limitation of the present invention. More than one rotatable antennae may be disposed between the base 706 and the second rotatable antenna 704. FIG. 8 is a diagram illustrating an antenna assembly 800 according to some embodiments of the present invention. The antenna assembly 800 comprises a first rotatable antenna 802, a second rotatable antenna 804, and a third rotatable antenna 806. The first rotatable antenna 802, the second rotatable antenna 804, and the third rotatable antenna 806 are connected in series. According to some embodiments, the antenna assembly 800 is arranged to point downward to transmit video data to a communication point directly below or around it, e.g., a boat or a land vehicle. Therefore, the base 808 of the antenna assembly 800 is on the top of the antenna assembly 800. In application, the base 808 is installed on the bottom of a UAV, for example, to make the antenna assembly 800 to point downward. The first rotatable antenna 802 comprises a first rod 8022, a first casing 8024, a first antenna 8026, and a first moving control system 8028. The second rotatable antenna 804 comprises a second rod 8042, a second casing 8044, a second antenna 8046, and a second moving control system 8048. The third rotatable antenna 806 comprises a third rod 8062, a third casing 8064, a third antenna 8066, a fourth antenna 8068, a third moving control system 8070, and a fifth antenna 8072.

In comparison to the antenna assembly 700, the antenna assembly 800 further comprises the second rotatable antenna 804 disposed between the first rotatable antenna 802 and the third rotatable antenna 806. According to some embodiments, the second rotatable antenna 804 is similar to the first rotatable antenna 802. As the first rotatable antenna 802 and the second rotatable antenna 804 are similar to the first rotatable antenna 702, and the third rotatable antenna 806 is similar to the second rotatable antenna 704, the detailed description of the first rotatable antenna 802, the second rotatable antenna 804, and the third rotatable antenna 806 are omitted here for brevity.

It is noted that, in the antenna assembly 800, the GPS receiver or a wireless receiver is not installed on the outer surface of the first casing 8024, the casing 8044, and the third casing 8064. However, this is not a limitation of the present embodiment. A GPS receiver may be installed on a suitable position on the outer surfaces of the first casing 8024, the casing 8044, and the third casing 8064 for receiving GPS coordinates from satellite.

According to some embodiments, the operations of the first rotatable antenna 802, the second rotatable antenna 804, and the third rotatable antenna 806 are independent. The first moving control system 8028, the second moving control system 8048, and the third moving control system 8048 are arranged to rotate the corresponding first casing 8024, the second casing 8044, and the third casing 8064 independently. In addition, the rotation of the first antenna 8026, the rotation of the second antenna 8046, and the rotation of the third antenna 8066 are independent. The omni-directional antenna 8072 at the very bottom of the three rotatable antennae 802, 804, and 806 can broadcast the GPS coordinate of the UAV to other communication points.

Figure 9:
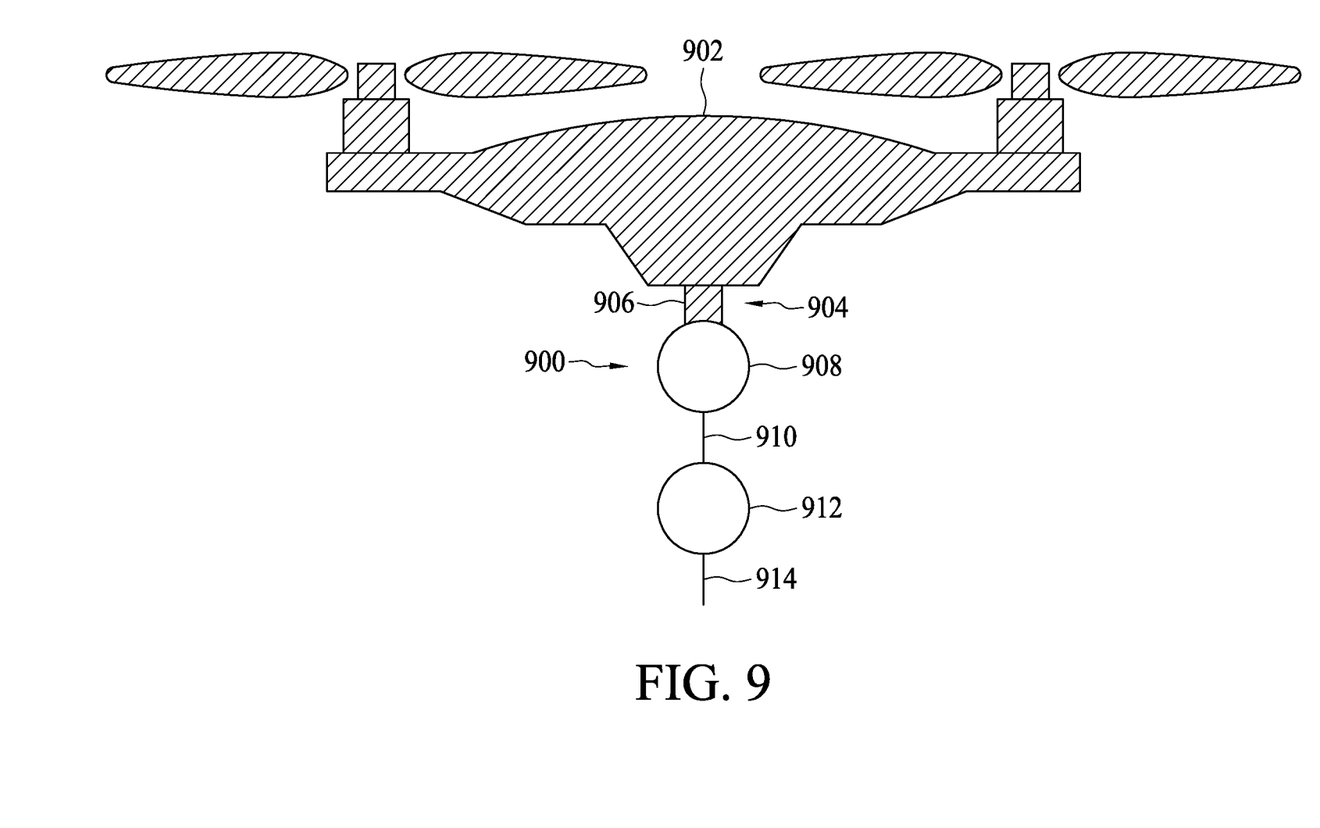
FIG. 9 is a diagram illustrating a UAV applying an antenna assembly according to some embodiments of the present invention.

FIG. 9 is a diagram illustrating a UAV 902 applying an antenna assembly 900 according to some embodiments of the present invention. The antenna assembly 900 may be the antenna assembly 700. The antenna assembly 900 is arranged to point downward for transmitting video data to a communication point below or around the UAV 902, e.g., a land vehicle. According to the embodiment of FIG. 9, the antenna assembly 900 is installed on the bottom 904 of the UAV 902 for communicating with a vehicle moving below or around the UAV 902. To make the antenna assembly 900 pointing downward, the base 906 of the antenna assembly 900 is installed on the bottom 904 of the UAV 902. The other elements of the antenna assembly 900, such as the first spherical casing 908, the rod 910, the second spherical casing 912, and the omni-directional antenna 914, are disposed below the base 906. It is noted that, similar to the antenna assembly 700, the antenna assembly 900 comprises a first rotatable antenna and a second rotatable antenna. As the configuration of the antenna assembly 900 is similar to the antenna assembly 700, and the detailed description is omitted here for brevity.

Figure 10:
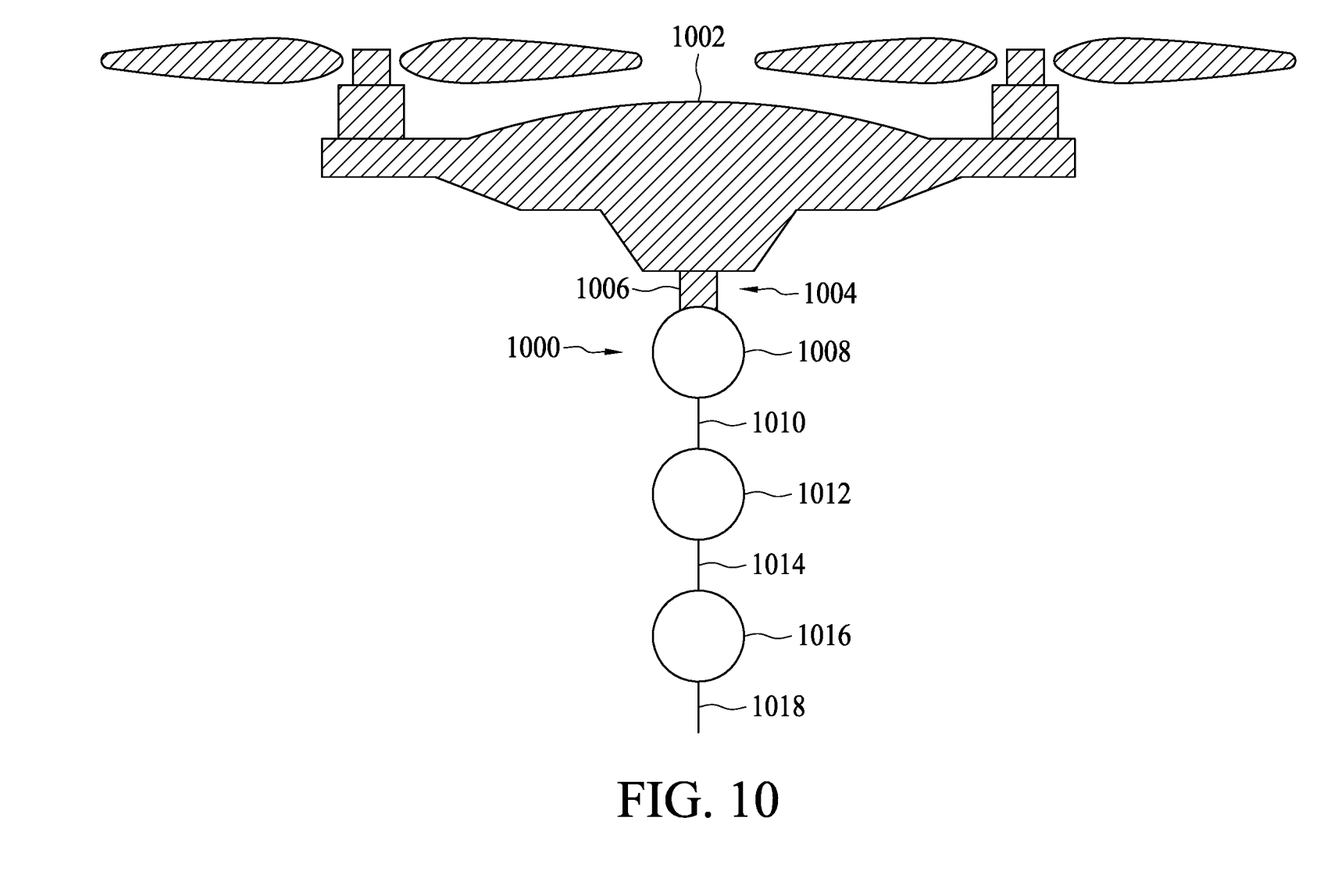
FIG. 10 is a diagram illustrating a UAV applying an antenna assembly according to some embodiments of the present invention.

FIG. 10 is a diagram illustrating a UAV 1002 applying an antenna assembly 1000 according to some embodiments of the present invention. The antenna assembly 1000 may be the antenna assembly 800. The antenna assembly 800 is arranged to point downward for transmitting video data to a communication point below or around the UAV 1002, e.g., a land vehicle. According to the embodiment of FIG. 10, the antenna assembly 1000 is installed on the bottom 1004 of the UAV 1002 for communicating with a vehicle moving below or around the UAV 1002. To make the antenna assembly 1000 pointing downward, the base 1006 of the antenna assembly 1000 is installed on the bottom 1004 of the UAV 1002. The other elements of the antenna assembly 1000, such as the first spherical casing 1008, the rod 1010, the second spherical casing 1012, the rod 1014, the third spherical casing 1016, and the omni-directional antenna 1018, are disposed below the base 1006. It is noted that, similar to the antenna assembly 800, the antenna assembly 1000 comprises a first rotatable antenna, a second rotatable antenna, and a third rotatable antenna. As the configuration of the antenna assembly 1000 is similar to the antenna assembly 800, and the detailed description is omitted here for brevity.

According to the embodiments of FIG. 9 and FIG. 10, a plurality of rotatable antennae are serially installed on the bottom of a UAV, and the plurality of rotatable antennae have the minimum interference with each other. Therefore, the capability of data transmission of the present antenna assembly is improved.

The above mentioned string of spherical antenna assemblies can be a modular assembly where each individual spherical antenna assemblies can be detachably removed.

In another embodiment, the above mentioned string of spherical antenna assemblies may not be a modular assembly, and the multiple spherical antenna assemblies are fixedly arranged in a series and may not be detachable removed.

In another contemplated embodiment, the multiple assemblies in a series may be interchangeably installed on a car, on a tripod, under a drone, on a boat, etc.

In yet another contemplated embodiment, the multiple assemblies in a series can be quickly and detachably attached to a car, on a tripod, under a drone, on a boat, etc. For example, when a multiple assemblies in a series on a drone has malfunctioned in the field, the user may quickly detach it and reinstall another multiple assemblies in a series onto the drone with ease, allowing a quick replacement so the drone may continue its duty with minimum down time.

Figure 11:
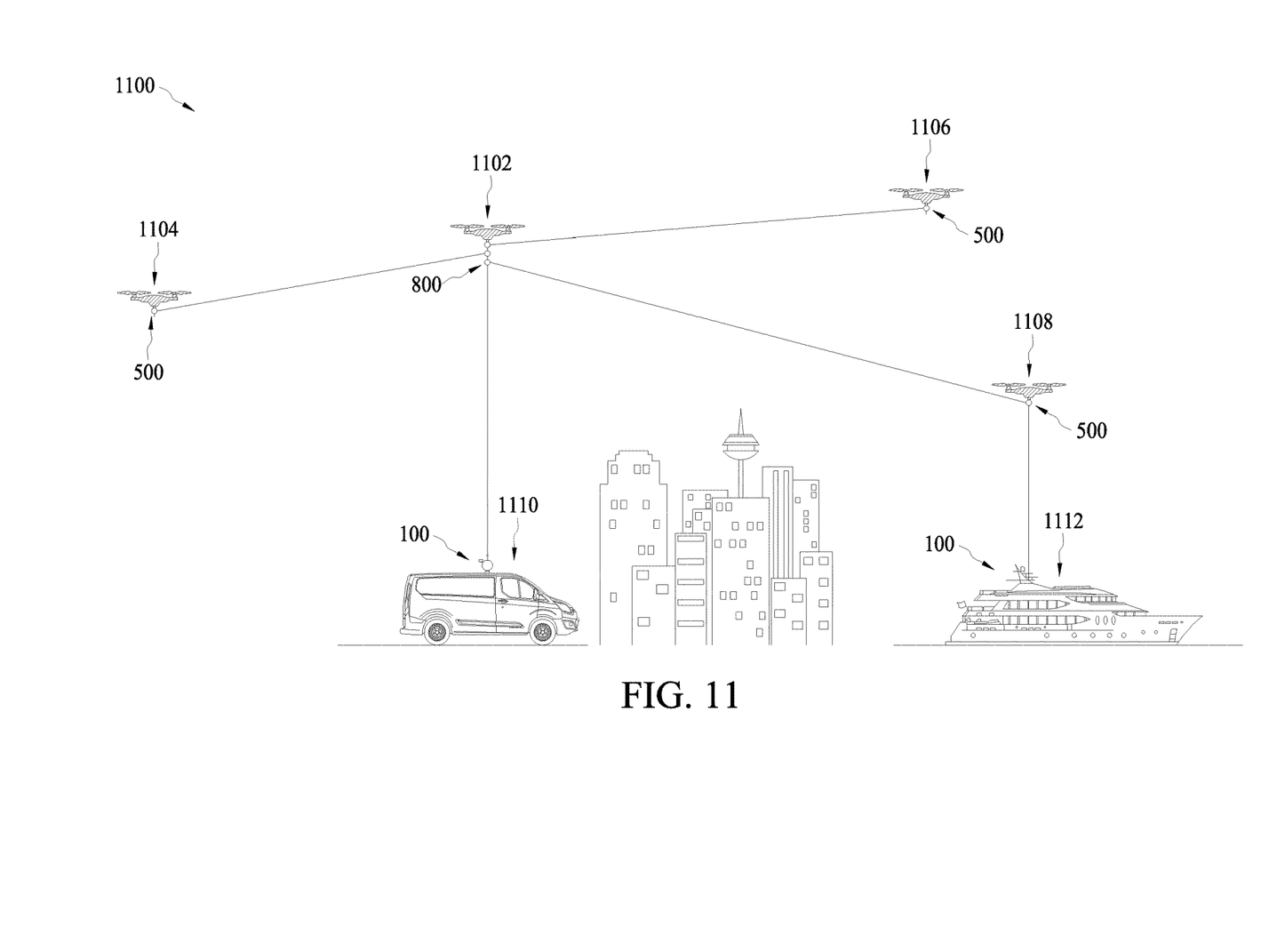
FIG. 11 is a diagram illustrating a wireless communication system according to some embodiments of the present invention.

FIG. 11 is a diagram illustrating a wireless communication system 1100 according to some embodiments of the present invention. The communication system 1100 may comprise a plurality of communication points 1102, 1104, 1106, 1108, 1110, and 1112. However, this is not a limitation of the present invention. Each of the communication points 1102, 1104, 1106 is installed with an antenna assembly. According to some embodiments, the communication point 1102 is a UAV installed with the antenna assembly 800. The communication points 1104, 1106, and 1108 are UAVs installed with the antenna assembly 500. The communication point 1110 is a land vehicle installed with the antenna assembly 100. The communication point 1112 is a boat installed with the antenna assembly 100. By using the above mentioned controlling mechanism, the communication points 1102, 1104, 1106, 1108, 1110, and 1112 can effectively communicate with each other using the antenna assembly disclosed herein. For example, the first panel antenna 8026 of the antenna assembly 800 on the first communication point 1102 is configured to communicate with the panel antenna 508 of the antenna assembly 500 on the third communication point 1106. The second panel antenna 8046 of the antenna assembly 800 on the first communication point 1102 is configured to communicate with the panel antenna 508 of the antenna assembly 500 on the second communication point 1104. The third panel antenna 8066 of the antenna assembly 800 on the first communication point 1102 is configured to communicate with the panel antenna 508 of the antenna assembly 500 on the fourth communication point 1108. The omni-directional antenna 8072 or the helical antenna 8068 of the antenna assembly 800 on the first communication point 1102 is configured to communicate with the omni-directional antenna 112 or the helical antenna 110 of the antenna assembly 100 on the fourth communication point 1110. The omni-directional antenna 512 or the helical antenna 510 of the antenna assembly 500 on the fourth communication point 1108 is configured to communicate with the omni-directional antenna 112 or the helical antenna 110 of the antenna assembly 100 on the sixth communication point 1112.

The contemplated spherical antenna assembly may be used in any scenarios where multiple antennae are typically installed at a single location. The contemplated spherical antenna assembly provides a streamlined look with the messy look of exposed multiple antennae.

A string of multiple spherical antenna assemblies can be hung from tall buildings at street intersections in a downtown setting, where the large number of tall buildings typically affect wireless transmission of any kind. In this way, installation of the contemplated antenna assemblies enhances wireless transmission within the city. In another way, it enhances communication to and from a drone if the drone is to operate among those buildings.

Although a string of spherical assembly is shown, various other shapes and sizes are also contemplated. The shape of the outer casing can be any other aerodynamic shapes.

In some embodiments, the shape of the outer casing can be a cylindrical shape. In that way, when multiple numbers of the disclosed assembly is hung under a drone, the multiple numbers of cylinders stacking on top of each other would create the look of one single long cylinder.

According to some embodiments, an antenna assembly is provided. The antenna assembly comprises a first rod, a first casing, a second rod, and a second casing. The first casing has a first antenna installed thereon, the first casing is coupled to the first rod. The second rod is coupled to an outer surface of the first casing. The second casing has a plurality of second antennas installed thereon, and the second casing is coupled to the second rod.

According to some embodiments, an antenna assembly is provided. The antenna assembly comprises a first rod, a first antenna device, a second rod, and a second antenna device. The first antenna device is coupled to the first rod, and the first antenna device is rotatable around the first rod. The second rod is coupled to the first antenna device. The second antenna device is coupled to the second rod, and the second antenna device is rotatable around the second rod.

In another aspect, the casings can be directly connected to each other without the need for connecting rods.

While most of the embodiments disclosed herein specifically provides that the casings can rotate independent of each other, it is specifically noted that one embodiment of the discloses specifically provides casings that do not rotate and are fixedly disposed on a UAV.

Thus, specific embodiments and applications of a spherical antenna been disclosed. It should be apparent, however, to those skilled in the art that many more modifications besides those already described are possible without departing from the disclosed concepts herein. Insubstantial changes from the disclosure as viewed by a person with ordinary skill in the art, now known or later devised, are expressly contemplated as being equivalent within the scope of the disclosure. Therefore, obvious substitutions now or later known to one with ordinary skill in the art are defined to be within the scope of the disclosure. The disclosed inventive subject matter is thus to be understood to include what is specifically illustrated and described above, what is conceptually equivalent, what can be obviously substituted and also what essentially incorporates the essential idea of the embodiments.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An antenna assembly to communicate with a plurality of communication points simultaneously, comprising:
    a first casing having a first flat panel antenna pivotably installed therein;
    a second casing having a second flat panel antenna pivotably installed therein;
    at least one motor disposed within each of said first and second casings;
    wherein the second casing is rotatably coupled to the first casing; and
    wherein the first casing is configuring of rotating independent of the second casing; and
    wherein the second casing is disposed directly below the first casing.

2. The antenna assembly of claim 1 further comprising a helical antenna enclosed within the second casing.

3. The antenna assembly of claim 1 further comprising an omni-directional antenna disposed on an outer surface of the second casing.

4. The antenna assembly of claim 1, further comprising:
    a third casing having a third flat panel antenna disposed therein, the third casing is coupled to the first casing;
    wherein the first casing, second casing, and third casing have substantially similar shapes.

5. The antenna assembly of claim 1 further comprising a helical antenna coupled to a bottommost casing in said first and second casings.

6. The antenna assembly of claim 1 further comprising an inertial measurement unit coupled to at least one of said first and second flat panel antennae.

7. The antenna assembly of claim 1 further comprising at least one power source disposed within said first and second casings.

8. An unmanned aerial vehicle, comprising:
    a first casing having a first flat panel antenna disposed therein, the first casing rotatably disposed on a bottom side of the unmanned aerial vehicle and being rotatable independent of the unmanned aerial vehicle;
    a second casing having a second flat panel antenna disposed therein, the second casing rotatably coupled to the first casing and being rotatable independent of the first casing;
    a first controlling device to rotate the first casing;
    a second controlling device to rotate the second casing;
    a helical antenna enclosed by the second casing; and
    an omni-directional antenna disposed on an outer surface of the second casing.

9. The unmanned aerial vehicle of claim 8 further comprising:
    a third casing coupled to the first casing;
    wherein the first casing, the second casing, and the third casing are connected in series.

10. A method of using a relay UAV (unmanned aerial vehicle) to simultaneously relay data between a transmission point located below the relay UAV and a plurality of working UAVs:
    providing said relay UAV to fly directly above said transmission point;
    wherein said transmission point includes a ground vehicle, a watercraft, a stationary transmission point, and a portable transmission device;
    providing said plurality of working UAV to fly in the air;
    providing a first casing having a first flat panel antenna pivotably installed therein, and the first casing is coupled to a bottom side of the relay UAV;
    providing a second casing, having a second flat panel antenna pivotably installed therein; and
    providing a helical antenna disposed within the bottommost of said first and second casings, and the helical antenna is adapted to transmit data received from said first and second panel antennae, and send to said transmission point;
    wherein the second casing is rotatably coupled to the first casing; and
    wherein the first casing is configuring of rotating independent of the second casing;
    wherein the second casing is disposed directly below the first casing.

11. The method as recited in claim 10 further providing a third casing having a third flat panel antenna pivotably installed therein, and wherein the third casing is rotatably coupled to the second casing.

12. The method as recited in claim 10 further providing an omni-directional antenna disposed on a bottommost of said first and second casings.

13. The method as recited in claim 10, wherein the data is at least one of a control signal, an image signal, and a video signal.

14. The method as recited in claim 10, provided that first panel antenna is adapted to communicate with a first UAV from the plurality of UAVS, and second panel antenna is adapted to communicate with a second UAV from the plurality of UAVS.

* * * * *